(12) United States Patent
Bogumil et al.

(10) Patent No.: US 9,263,754 B2
(45) Date of Patent: Feb. 16, 2016

(54) INTEGRATED ENVIRONMENTALLY PROTECTIVE BARRIER WITH LIGHT BLOCKING AND LIGHT TRANSMITTING FEATURES TO OPTICALLY COMMUNICATE BETWEEN TWO ELECTRONIC DEVICES OPERATING IN DIFFERENT ENVIRONMENTS

(71) Applicant: GM Global Technology Operations LLC, Detroit, MI (US)

(72) Inventors: Todd D. Bogumil, Rochester, NY (US);
Michael F. Zawisa, Victor, NY (US);
Kenneth L. Kaye, Fairport, NY (US);
Mark A. Buffa, Utica, MI (US); David J. Keyes, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 272 days.

(21) Appl. No.: 13/705,526

(22) Filed: Dec. 5, 2012

(65) Prior Publication Data
US 2014/0153932 A1 Jun. 5, 2014

(51) Int. Cl.
*H01M 8/04* (2006.01)
(52) U.S. Cl.
CPC ...... *H01M 8/04559* (2013.01); *H01M 8/04664* (2013.01); *Y02E 60/50* (2013.01)

(58) Field of Classification Search
CPC H01M 8/04; H01M 8/04559; H01M 8/04664
USPC .......................................................... 429/432
See application file for complete search history.

(56) References Cited

U.S. PATENT DOCUMENTS

| 7,421,356 B2 | 9/2008 | Rea et al. |
| 8,089,290 B2 | 1/2012 | Fuss et al. |
| 2006/0127729 A1* | 6/2006 | Roscoe et al. ................. 429/34 |
| 2008/0231836 A1* | 9/2008 | Curello et al. ................. 356/72 |
| 2011/0217613 A1* | 9/2011 | Rea ........................ H01M 8/04 429/432 |

* cited by examiner

*Primary Examiner* — Karie O'Neill Apicella
(74) *Attorney, Agent, or Firm* — Dinsmore & Shohl LLP

(57) ABSTRACT

An integrated environmental barrier for protecting the receiver portion of a fuel cell stack health monitoring system. The stack health monitoring system includes a transmitting measurement module and an optical communication module having a receiver. Measurements indicating the health of the fuel cell stack are optically communicated between the transmitter and receiver through the environmentally protective barrier. The environmentally protective barrier is disposed between the measurement module and the optical communication module such that the environmental barrier isolates the optical communication module from the environment contained within the fuel cell stack. The environmental barrier comprises light blocking and light transmitting portions enabling system variation while ensuring signal integrity.

23 Claims, 4 Drawing Sheets

INTEGRATED ENVIRONMENTALLY PROTECTIVE BARRIER WITH LIGHT BLOCKING AND LIGHT TRANSMITTING FEATURES TO OPTICALLY COMMUNICATE BETWEEN TWO ELECTRONIC DEVICES OPERATING IN DIFFERENT ENVIRONMENTS

BACKGROUND OF THE INVENTION

The present invention relates generally to a protective barrier for a fuel cell stack health monitoring system, and more particularly to an environmental barrier which protects the receiver portion of a fuel cell stack health monitoring system.

In a typical fuel cell system, hydrogen or a hydrogen-rich gas is supplied as a reactant through a flowpath to the anode side of a fuel cell while oxygen (such as in the form of atmospheric oxygen) is supplied as a reactant through a separate flowpath to the cathode side of the fuel cell. Catalysts, typically in the form of a noble metal such as platinum, are placed at the anode and cathode to facilitate the electrochemical conversion of the reactants into electrons and positively charged ions (for the hydrogen) and negatively charged ions (for the oxygen). An electrolyte layer separates the anode from the cathode to allow the selective passage of ions from the anode to the cathode while simultaneously prohibiting the passage of the generated electrons, which instead are forced to flow through an external electrically-conductive circuit (such as a load) to perform useful work before recombining with the charged ions at the cathode. The combination of the positively and negatively charged ions at the cathode results in the production of non-polluting water as a byproduct of the reaction.

One form of fuel cell, called the proton exchange membrane (PEM) fuel cell, has shown particular promise for vehicular and related mobile applications. The electrolyte layer of a PEM fuel cell is in the form of a solid proton-transmissive membrane (such as a perfluorosulfonic acid membrane, a commercial example of which is Nafion™). The presence of an anode separated from a cathode by such an electrolyte layer forms a single PEM fuel cell; many such single cells can be combined to form a fuel cell stack, increasing the power output thereof. Multiple stacks can be coupled together to further increase power output.

Fuel cells require balanced water levels to ensure proper operation. For example, it is important to avoid having too much water in the fuel cell, which can result in the flooding or related blockage of the reactant flowfield channels, thereby hampering cell operation. On the other hand, too little hydration limits the electrical conductivity of the membrane and can lead to premature cell failure. Exacerbating the difficulty in maintaining a balance in water level is that there are numerous conflicting reactions taking place in a fuel cell that are simultaneously increasing and decreasing local and global hydration levels.

Regarding flooding in particular, as more flow channels are blocked and less reactant gas flows through, electricity produced by the fuel cell decreases. Because the fuel cells are electrically coupled in series, if one of the fuel cells fails, the entire stack may fail. For this reason, determining the presence or absence of liquid water in a fuel cell flowfield is desirable. However, the hydration and water level balance requirements of the fuel cell create a less-than-ideal environment for the electronics used to sense and determine such water presence. Current systems for monitoring fuel cell stack health include wired transmission of stack vitals. However, the wired transmission equipment is particularly susceptible to humidity and the presence of liquid water.

SUMMARY OF THE INVENTION

In view of the above, an environmentally protective barrier with light blocking and light transmitting portions for a system that monitors and optically communicates fuel cell stack health is described. Additionally, the integration of the receiver portion into the system is described. According to one aspect of the disclosed invention, a system for monitoring the health of a fuel cell stack comprises a measurement module in signal communication with an optical communication module such that a property associated with the health of the fuel cell stack is measured by the measurement module through the optical communication module, and an environmental barrier disposed between the measurement module and the optical communication module such that the environmental barrier isolates the optical communication module from the environment contained within the fuel cell stack.

The stack health monitoring system includes a transmitter and a receiver that optically communicate voltage or related measurements, which may include diagnostic messages, timing, and framing, across the environmentally protective barrier.

According to another aspect of the disclosed invention, a fuel cell stack comprises a plurality of fuel cells each of which comprises an anode, a cathode, and a membrane disposed between said anode and cathode to facilitate the transfer of an ionized fluid there between; a first reactant flowpath to convey a hydrogen-bearing fluid to and from the anode; a second reactant flowpath to convey an oxygen-bearing fluid to the cathode; a plurality of manifolds, disposed on opposing ends of the fuel cell stack, for delivery and removal of the hydrogen-bearing fluid and the oxygen-bearing fluid through the first reactant flowpaths and the second reactant flowpath; a system for monitoring the health of a fuel cell stack, the system comprising a measurement module and an optical communication module in signal communication with the measurement module such that a property associated with the health of the fuel cell stack is measured by the measurement module through the optical communication module; and an environmental barrier disposed between the measurement module and the optical communication module such that the environmental barrier isolates the optical communication module from the environment contained within the fuel cell stack.

According to another aspect of the disclosed invention, a method of measuring a property within at least one fuel cell within a fuel cell stack comprises measuring the property and transmitting the property using a measurement module; receiving the property using an optical communication module wherein the communication module is in signal communication with the measurement module; and using an environmental barrier disposed between the measurement module and the optical communication module to isolate the optical communication module from an environment contained within the fuel cell stack.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner.

Figure 1:
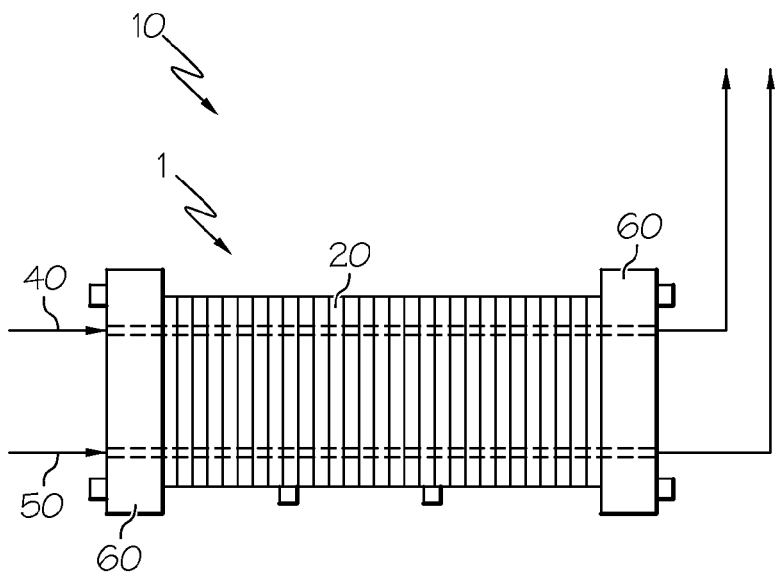
FIG. 1 is a schematic view of a fuel cell stack.
Figure 2:
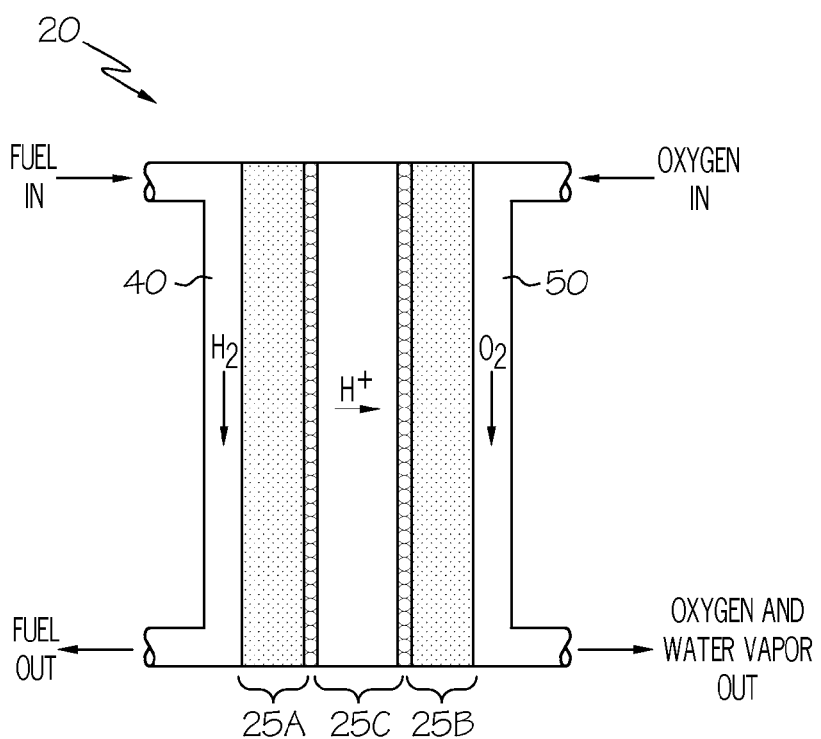
FIG. 2 is a detailed view of an individual fuel cell within the stack of FIG. 1.
Figure 3:
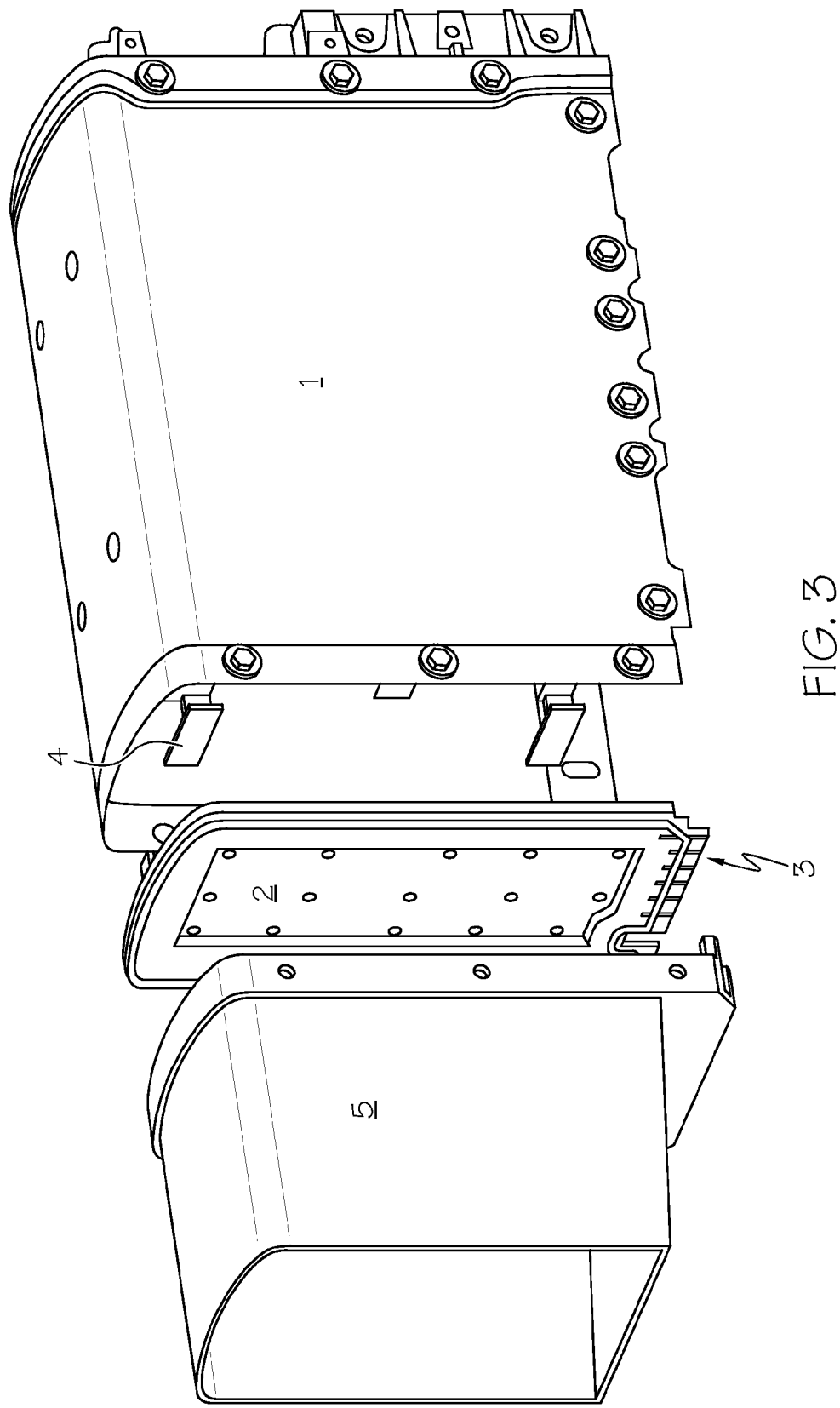
FIG. 3 is an exploded view of a fuel cell stack containing an embedded measurement module for transmitting fuel cell stack health, an environmental barrier containing an integrated optical communication module for optically receiving fuel cell stack health information from the embedded measurement module, and a housing.
Figure 5:
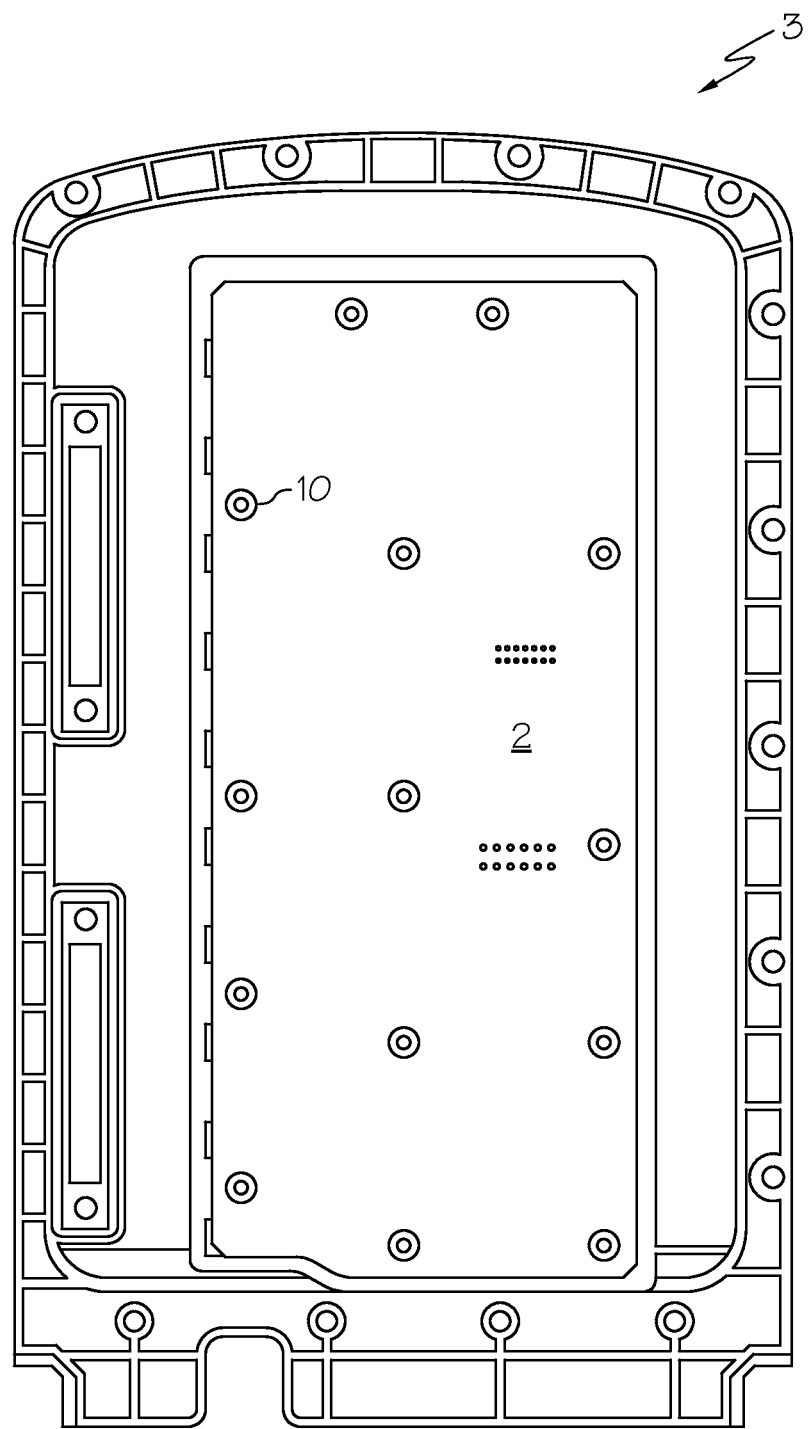
FIG. 5 is a detailed view of the physical mounts for the integrated optical communication module.

Referring first to FIGS. 1-3, a fuel cell system 10 including a fuel cell stack 1 is made up of numerous fuel cells 20 and includes a first reactant flowpath 40 to convey a hydrogen-bearing fluid to and from the anode 25A, while a second reactant flowpath 50 does the same with an oxygen-bearing fluid at cathode 25B. Manifolds 60 may be disposed at opposing ends of stack 1 to coordinate the delivery and removal of the reactants through the flowpaths 40, 50. Referring with particularity to FIG. 3, the fuel cell stack 1 contains an embedded measurement module 4 for transmitting fuel cell stack 1 health, an integrated optical communication module 2 for optically receiving fuel cell stack 1 health information from the embedded measurement module 4 mounted onto an environmental barrier 3, and a housing 5 are shown. The embedded measurement module 4 measures and transmits the voltage output of the fuel cell stack 1 to the optical communication module 2 to monitor the health of the fuel cell stack 1 Diagnostic messages, timing, or framing may also be transmitted. The optical communication module 2 is integrated into the environmental barrier 3 via mounts 10. The mounts 10 may include thermal staking as shown in FIG. 5. Voltage output of a fuel cell stack 1 is an indicator of the presence or absence of liquid water in fuel cell 20 flowfields; decreased voltage output indicates poor fuel cell stack 1 health. Because flooding or blockage of fuel cell 20 flow channels prevents reactant gasses from flowing through flow channels, electricity produced by the fuel cell decreases.

When in place against the housing 5, the environmental barrier 3 seals the housing 5. The embedded measurement module 4 is shown in the fuel cell stack 1. Because humidity exchange occurs in the fuel cell stack 1, it is not an ideal environment for electronic devices. As such, the environmental barrier 3 prevents humidity and liquid water from the fuel cell stack 1 from entering the housing 5 which contains electronics including the optical communication module 2.

Figure 4:
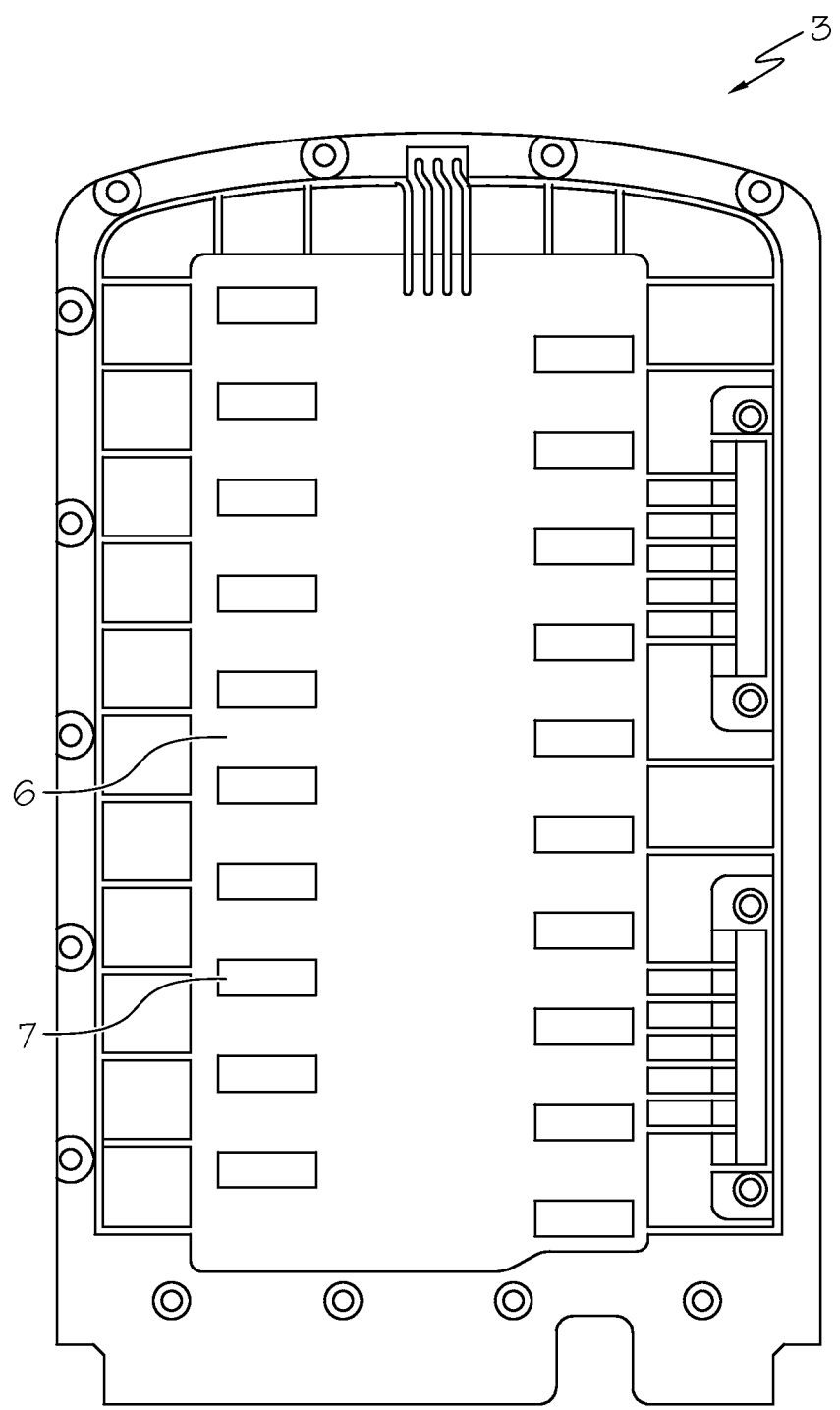
FIG. 4 is an end view of the environmental barrier of FIG. 3 showing light blocking and light transmitting portions.

Referring next to FIG. 4, which a person skilled in the art would appreciate is the reverse side of the environmental barrier 3 as shown in FIG. 5, the environmental barrier 3 is shown. The environmental barrier 3 acts as a seal between the fuel cell stack 1 and the housing 5. The optical communication module 2 is integrated into the environmental barrier 3 forming a single component, thereby protecting the optical communication module 2 from the potentially high humidity environment in the fuel cell stack 1. The environmental barrier 3 comprises light blocking 6 and light transmitting portions 7 which allow only target wavelengths to pass through the environmental barrier 3. The light blocking portions 6 may comprise opaque plating material. The light blocking 6 and light transmitting portions 7 of the environmental barrier 3 may comprise an applied material for deflecting light, absorbing light, reducing light, or combinations thereof or may comprise a textured surface. This applied material may be designed to block specific wavelengths ranging from 600 nanometers to 960 nanometers by adjusting the applied material used for deflecting light, absorbing light, reducing light, or combinations thereof or may comprise a textured surface. In the present context, an applied material includes one or more layers or coatings of material configured to provide the desired optical performance. In one non-limiting example, the applied material may be in the form of an optical stack. The environmental barrier 3 may be, but is not limited to polycarbonate or acrylic, an injection mold of clear plastic, a metal/plastic hybrid, or a hybrid of metal and lens material with a thickness generally between 2.0 and 3.0 mm. Additional light blocking layers may be 2.0-5.0 mm, depending on the geometry.

While certain representative embodiments and details have been shown for purposes of illustrating the invention, it will be apparent to those skilled in the art that various changes may be made without departing from the scope of the invention, which is defined in the appended claims.

What is claimed is:

1. A system for monitoring the health of a fuel cell stack, the system comprising:
    a measurement module;
    an optical communication module in signal communication with the measurement module such that a property associated with the health of the fuel cell stack is measured by the measurement module and transmitted to the optical communication module; and
    an environmental barrier disposed between the measurement module and the optical communication module such that the environmental barrier isolates the optical communication module from the environment contained within the fuel cell stack;
    wherein the environmental barrier comprises light blocking and light transmitting portions which allow only target wavelengths to pass through the environmental barrier.

2. The system of claim 1 wherein the environmental barrier comprises opaque plating material disposed on at least a portion thereof to prevent optical communication there through.

3. The system of claim 1 wherein the environmental barrier comprises a build-up material for deflecting light, absorbing light, reducing light, or combinations thereof.

4. The system of claim 1 wherein the environmental barrier comprises a textured surface.

5. The system of claim 1 wherein the environmental barrier isolates the optical communication module from humidity contained within the fuel cell stack.

6. The system of claim 1 wherein the environmental barrier isolates the optical communication module from humidity within the fuel cell stack.

7. A fuel cell stack comprising a plurality of fuel cells each of which comprises an anode, a cathode, and a membrane disposed between said anode and cathode to facilitate the transfer of an ionized fluid there between;
    a first reactant flowpath to convey a hydrogen-bearing fluid to the anode;
    a second reactant flowpath to convey an oxygen-bearing fluid to the cathode;

a plurality of manifolds in fluid communication with the fuel cell stack for delivery and removal of the hydrogen-bearing fluid and the oxygen-bearing fluid through the respective first reactant flowpaths and the second reactant flowpath; and a system for monitoring the health of a fuel cell stack, the system comprising a measurement module, an optical communication module in signal communication with the measurement module such that a property associated with the health of the fuel cell stack is measured by the measurement module and transmitted to the optical communication module, and an environmental barrier disposed between the measurement module and the optical communication module such that the environmental barrier isolates the optical communication module from the environment contained within the fuel cell stack;

wherein the environmental barrier comprises light blocking and light transmitting portions which allow only target wavelengths to pass through the environmental barrier.

8. The fuel cell stack of claim 7 wherein the environmental barrier comprises opaque plating material on the light blocking portions.

9. The fuel cell stack of claim 7 wherein the light blocking and light transmitting portions comprise an applied material for deflecting light, absorbing light, reducing light, or combinations thereof.

10. The fuel cell stack of claim 9 wherein the applied material is integrally formed with the environmental barrier and wherein the applied material is the same material as the environmental barrier.

11. The fuel cell stack of claim 9 wherein the applied material is integrally formed with the environmental barrier and wherein the applied material is a carrier material different from the material of the environmental barrier.

12. The fuel cell stack of claim 9 wherein the applied material is an attached piece of material made from the same material as the environmental barrier.

13. The fuel cell stack of claim 9 wherein the applied material is an attached piece of material made from a carrier material different from the material of the environmental barrier.

14. The fuel cell stack of claim 7 wherein the environmental barrier comprises a textured surface.

15. The fuel cell stack of claim 7 comprising an optical communication module for receiving a transmission of the health of a fuel cell stack, wherein the optical communication module is embedded in the environmental barrier.

16. The fuel cell stack of claim 14 comprising means for mounting the optical communication module onto the environmental barrier.

17. The system of claim 1 wherein the measurement module is embedded within the fuel cell stack.

18. A method of measuring a property within at least one fuel cell within a fuel cell stack comprising:

measuring the property and transmitting the property using a measurement module;

receiving the property using an optical communication module wherein the optical communication module is in signal communication with the measurement module; and using an environmental barrier disposed between the measurement module and the optical communication module to isolate the optical communication module from an environment contained within the fuel cell stack;

wherein the environmental barrier comprises light blocking and light transmitting portions which allow only target wavelengths to pass through the environmental barrier.

19. The method of claim 18 wherein the property is used to determine the health of the fuel cell stack.

20. The method of claim 18 wherein the property is a voltage.

21. The method of claim 18 wherein the property is transmitted and received optically.

22. The method of claim 19 wherein the measurement module is disposed inside the environment.

23. The method of claim 18 wherein the light blocking and light transmitting portions comprise an applied material for deflecting light, absorbing light, reducing light, or combinations thereof.

* * * * *